(12) United States Patent
Liu et al.

(10) Patent No.: US 7,940,608 B2
(45) Date of Patent: May 10, 2011

(54) AUTO FEED, COPY AND PRINT APPARATUS FOR INFORMATION STORAGE DISKS AND METHOD OF THE SAME

(75) Inventors: Ming-Hsun Liu, Taipei (TW); Chung-Hsuan Tsai, Taipei (TW)

(73) Assignee: Ming-Hsun Liu, Taipei (TW)

( * ) Notice: Subject to any disclaimer, the term of this patent is extended or adjusted under 35 U.S.C. 154(b) by 1057 days.

(21) Appl. No.: 11/736,476

(22) Filed: Apr. 17, 2007

(65) Prior Publication Data

US 2008/0123476 A1 May 29, 2008

(30) Foreign Application Priority Data

Nov. 24, 2006 (CN) .......................... 2006 1 0145284

(51) Int. Cl.
*G11B 7/085* (2006.01)
(52) U.S. Cl. ............... 369/30.28; 369/30.19; 369/30.32; 720/623
(58) Field of Classification Search ............... 369/30.28, 369/30.02, 30.19, 30.05, 47.12, 30.33, 30.34, 369/30.35, 30.85, 30.32; 720/623, 619, 621, 601; 400/48, 23; 347/104
See application file for complete search history.

(56) References Cited

U.S. PATENT DOCUMENTS 7,101,096 B2 * 9/2006 Sasai et al. ...................... 400/48
7,779,432 B2 * 8/2010 Liu et al. ....................... 720/623

* cited by examiner

*Primary Examiner* — Ali Neyzari
(74) *Attorney, Agent, or Firm* — Pai Patent & Trademark Law Firm; Chao-Chang David Pai (57) ABSTRACT

An auto feed, copy and print apparatus for information storage disks and a method of the same are disclosed. The apparatus includes a frame, a read/write and print device and a feeding device. The read/write and print device and the feeding device are mounted on the frame. The feeding apparatus feeds a disk once by gravity onto a tray of the read/write and print device. The tray retracts so as to perform copy and print disk cover operations. The Method includes steps of providing disks, using a feeding device to support the disks and feeds a single disk once by gravity, receiving the disk on a tray, retracting the tray with the disk into a read/write and print device, and using the read/write and print apparatus to write data into the disk and print the disk's cover.

20 Claims, 8 Drawing Sheets

AUTO FEED, COPY AND PRINT APPARATUS FOR INFORMATION STORAGE DISKS AND METHOD OF THE SAME

RELATED APPLICATIONS

This application claims priority to Chinese Application Serial Number 200610145284.9, filed Nov. 24, 2006, which is herein incorporated by reference.

BACKGROUND

1. Field of the Invention

The present invention relates to a duplicating apparatus and a duplicating method of information storage disks. More particularly, the present invention relates to a duplicating apparatus and a duplicating method that automatically feeds, copies and prints information storage disks such as compact disks.

2. Description of Related Art

Information storage disks, such as compact disks (CDs) including Compact Disc-Recordable (CD-R), Compact Disc ReWritable (CD-RW), DVD recordable (DVD-R) etc. are often used to store digital information in a variety of formats. Generally, for mass replication or manufacture of information storage disks such as compact disks, stamps are typically used to transfer data from the master to unrecorded or blank compact disks. However, using the stamp method is only suitable to replicate an amount of a thousand or more disks. Otherwise, the average cost to replicate or manufacture each single compact disk will be expensive and not economic.

For home users or small business users, burners are another solution to replicate disks when only several or tens of disk copies are needed. In addition, automatic burners are convenient to the home users or small business users and save much time when duplicating the compact disks.

A typical automatic compact disk duplication system comprises a robotic arm to deliver blank disks among several working positions. The robotic arm catches one blank disk and conveys the blank disk to a tray of a burner to write data in. After the burner writes the blank compact disk, the robotic arm removes the recorded disk from the tray and conveys the recorded disk to a disk container. Then, the robotic arm catches another blank disk and places the blank disk to the burner tray to write. The operation of the robotic arm is repeated until an amount of the disk copies is achieved.

However, the mechanical structure of the robotic arm is sophisticated, which causes high manufacturing costs. Besides, the entire robotic arm is bulky and occupies a large storage space that is inconvenient to be packaged and/or transported. The automatic compact disk duplication system is expensive.

In addition, when the disk copy is completed, disk identifiers such as title of the disk, date, disk owner etc. are marked or written on the disk cover. Typically, the disk identifiers are hand written or printed by a printer separated from the burner. Hand to writing or printing the disk identifiers is inconvenient.

Further, as the storage capacity of the compact disk is increased, using the compact disks to backup data is becoming more common. When using the compact disks to backup data and several compact disks are needed, the copied disks may easily be confused if each compact disk does not have a unique disk identifier on its cover after the burner completes the disk duplication. This is also inconvenient for the disk duplication.

Therefore, there is a need to provide an improved automatic compact disk reproducing apparatus to mitigate or obviate the aforementioned problems.

SUMMARY

An object of the present invention is to provide a duplicating apparatus and a method for information storage disks to automatically feed, copy and print the optical disks.

An auto feed, copy and print apparatus for information storage disks in accordance with the present invention comprises a frame, a duplicating and printing device and a disk feeding device. The duplicating and printing device is mounted on the frame and comprises at least one tray. Each tray has an ejected position and a retracted position, and comprises a holding portion.

The disk feeding device is mounted on the frame and comprises a body and a disk feeding mechanism. The body has a disk feeding hole aligned with the holding portion when the tray is positioned at its ejected position. The disk feeding mechanism is mounted in the body and comprises multiple disk feeding wheels. The disk feeding wheels partially extend in the disk feeding hole to support a stake of compact disks over the disk feeding hole and feed a single one of the stake of compact disks falling onto the holding portion at the ejected position of the tray by gravity when the disk feeding wheels are rotated. The tray moves to the retracted position to copy and print the compact disk on the holding portion when the compact disk is fed on the holding portion.

A method to auto feed, copy and print information storage disks in accordance with the present invention comprises providing rewritable information storage disks; suspending the information storage disks in a stack by a disk feeding device and using gravity to sequentially pull the stacked information storage disks down through the disk feeding device; receiving single information storage disk in a sequential order with each information storage disk falling into a first tray; retracting the first tray with the single one of the falling information storage disks into a duplicating and printing device; and writing data into the information storage disk on the first tray and printing a cover of the information storage disk on the first tray by the duplicating and printing device.

The apparatus and the method in accordance with the present invention have several advantages as follows.

The apparatus automatically feeds an information storage disk onto a tray to duplicate and print. Using the apparatus is convenient, easy and saves time.

The apparatus and the method allow gravity to pull a single disk to automatically feed the disk onto the tray. Mechanical robots are not needed so that the entire volume of the apparatus is compact. Manufacturing costs of the apparatus is lowered.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
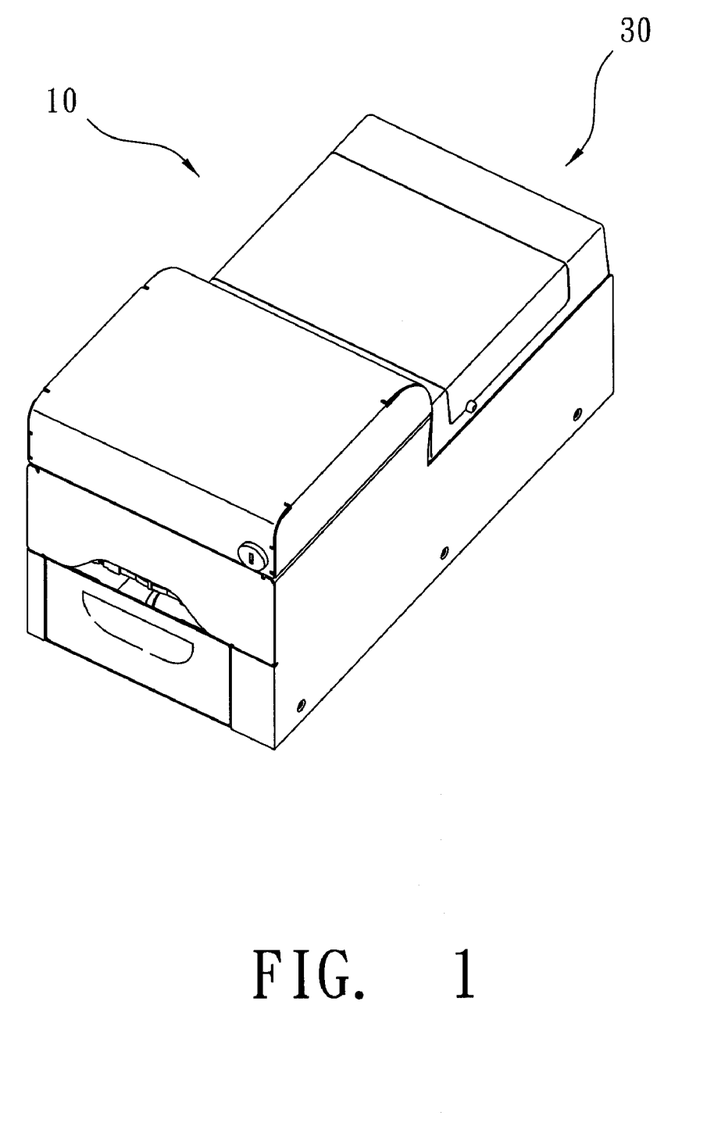
FIG. 1 is a perspective view of an embodiment of a duplicating apparatus in accordance with the present invention.
Figure 2:
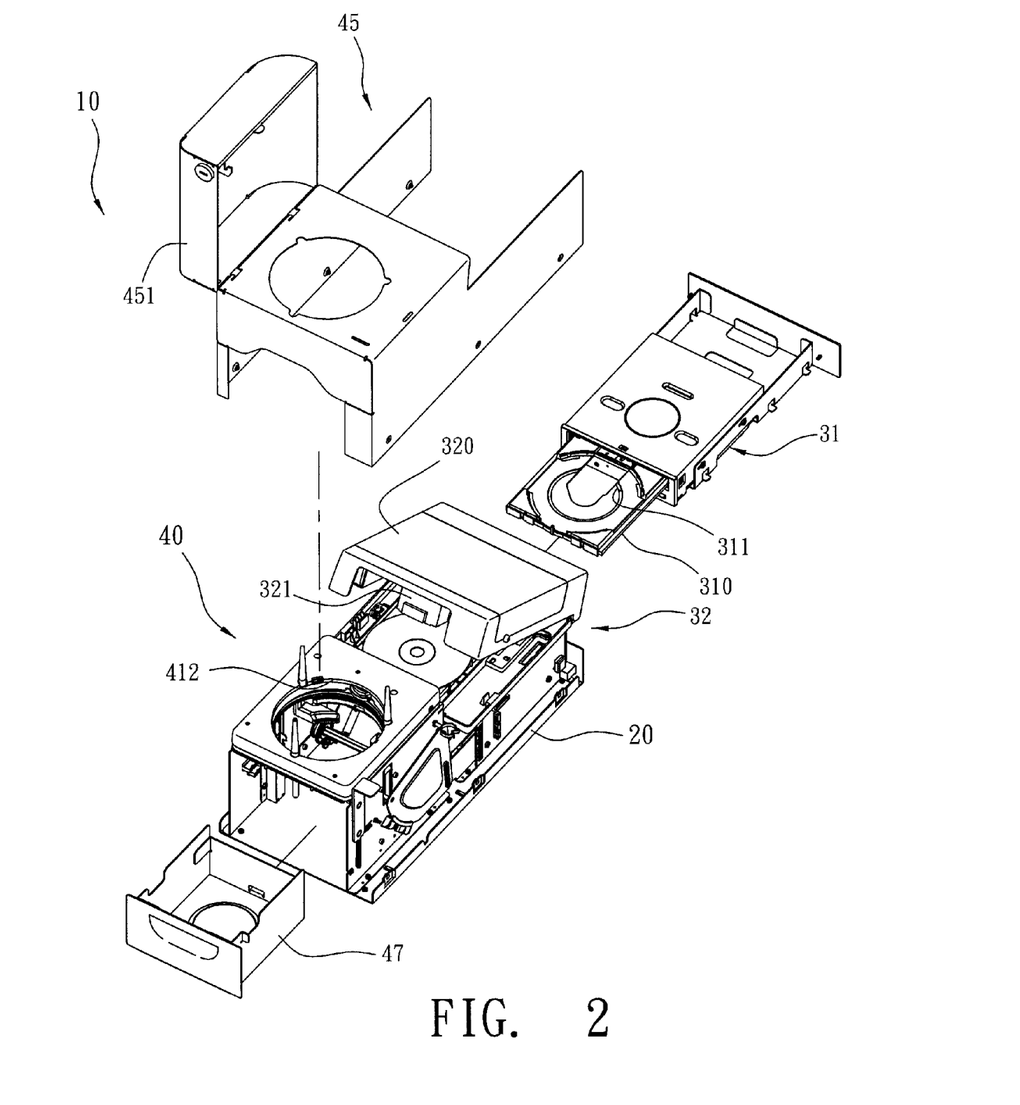
FIG. 2 is an exploded perspective view of the duplicating apparatus in FIG. 1.
Figure 3:
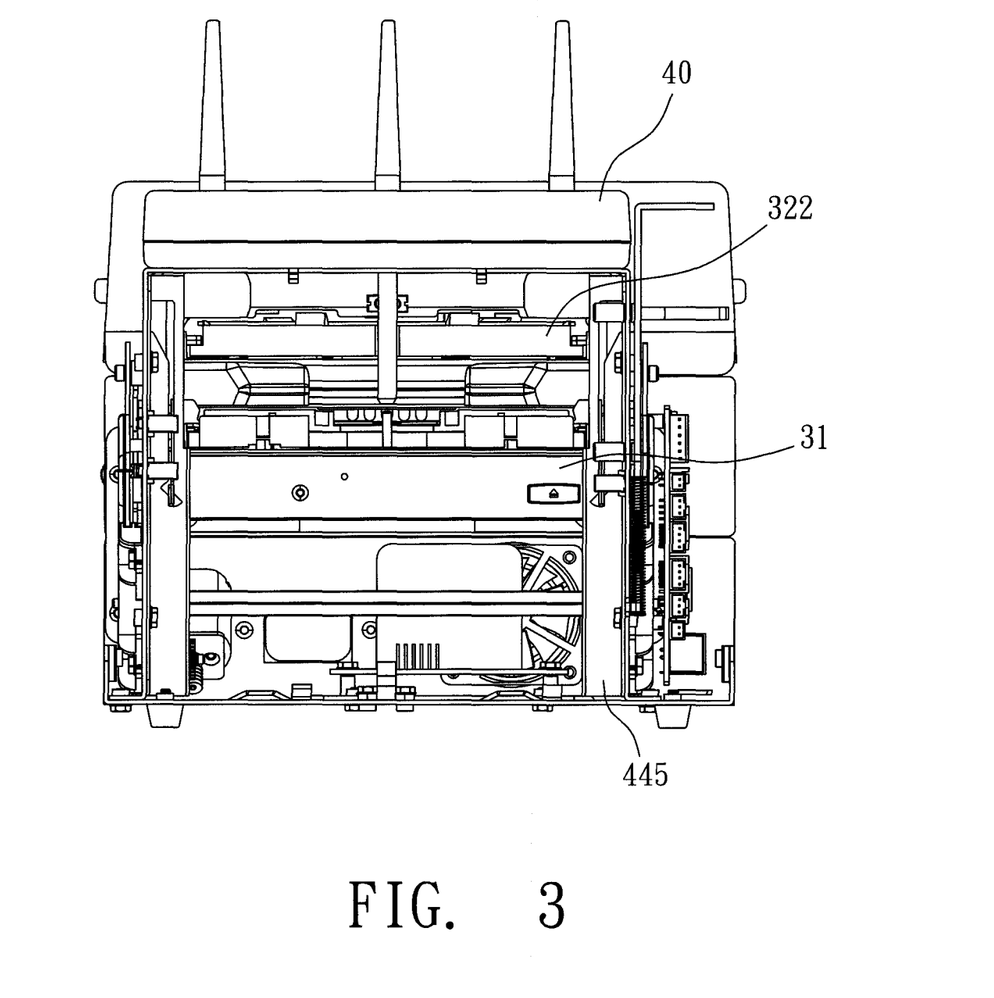
FIG. 3 is a front elevation view of the duplicating apparatus in FIG. 1 without a housing assembly.

Refer to FIG. 1, FIG. 2 and FIG. 3. An embodiment of an automatically feeding, copying and printing apparatus for information storage disks is disclosed, and the apparatus is designated with numeral 10. The apparatus 10 comprises a frame 20, a duplicating and printing device 30 and a disk feeding device 40. The apparatus 10 is adapted for optical readable and/or writable information storage medium, such as Rewritable compact disks, Recordable compact disks, DVDs, etc. The apparatus 10 writes data onto the disks to backup or duplicate the data. In addition, the disk feeding device 40 of the apparatus 10 allows gravity to pull a single disk onto trays of the duplicating and printing device 30 where the duplicating and printing device 30 retracts the trays to copy the disk and print the disk cover.

The duplicating and printing device 30 and the disk feeding device 40 are respectively mounted on the frame 20. The duplicating and printing device 30 comprises a duplicating apparatus 31 and a printing apparatus 32. In this embodiment, the duplicating apparatus 31 is a compact disk burner and comprises a first tray 310. The first tray 310 has an ejected position and a retracted position where the ejected position means that the first tray 310 is extended or ejected out of the duplicating apparatus 31, and the retracted position means that the first tray 310 is retracted inside the duplicating apparatus 31. The first tray 310 has a holding portion 311.

The duplicating and printing device 31 is mounted into the frame 20 through the rear of the frame 20 where the rear of the frame 20 is opposite to the disk feeding device 40. This mounting method of the duplicating and printing device 31 provides a compact size of the apparatus 10 and renders the volume of the entire apparatus 10 smaller.

When a single disk is fed by the disk feeding device 40 and is pulled by gravity onto the holding portion 311 of the first tray 310 where the first tray 310 is ejected to its ejected position, the first tray 311 with the disk could be retracted inside the duplicating apparatus 31 to copy and/or access data.

Figure 6:
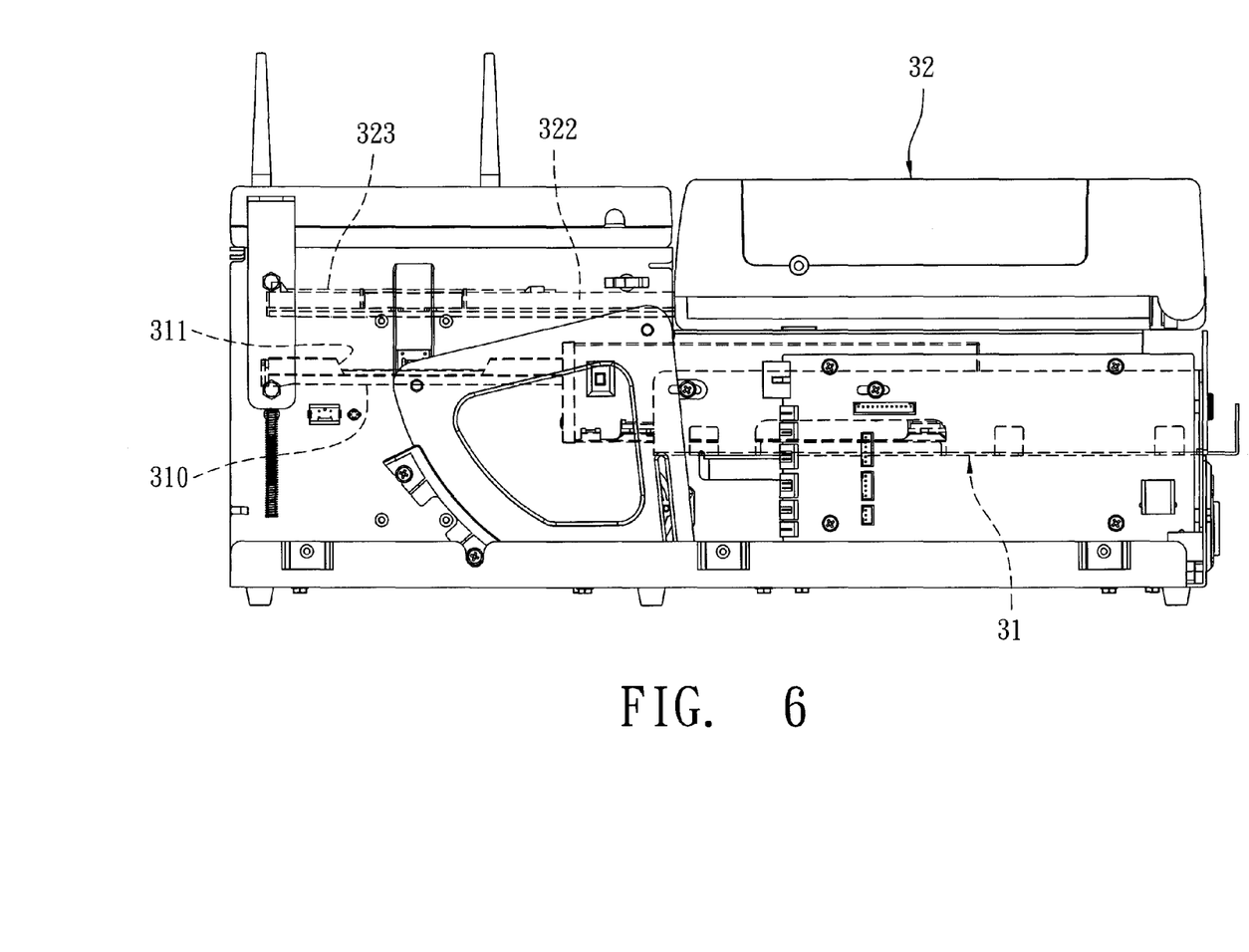
FIG. 6 is an operational elevation view of the duplicating apparatus in FIG. 1.

Further refer to FIG. 6. The printing apparatus 32 comprises a cover 320, a printing head 321 and a second tray 322. The cover 320 is pivotally mounted on the frame 20 and can be opened and adjusted to a given angle relative to the frame 20. The cover 320 can be opened manually or automatically.

Likewise, the second tray 322 has an ejected position and a retracted position where the ejected position means that the second tray 322 is extended or ejected out of the printing apparatus 32, and the retracted position means that the second tray 322 is retracted inside the printing apparatus 32. The second tray 322 has a holding portion 323.

When the disk is held on the holding portion 323 of the second tray 322 where the second tray 322 is ejected to its ejected position, the second tray 322 with the disk could be retracted inside the printing apparatus 32 to print disk identifiers on the disk cover. The disk identifiers may be title of the disk, date, summary of content etc.

The printing head 321 is mounted on the cover 320 to print the disk cover on the second tray 322. In addition, when the cover 320 is pivoted at its given angle, replacing the ribbon of the printing head 321 is convenient.

Operations of accessing and writing the disks, and printing the disk cover do not need any given sequence. In this embodiment, the data can be written on the disk and then the disk cover is printed. If writing the data onto the disk is fails, there is no need to print the disk cover so the printing operation is skipped.

Figure 5:
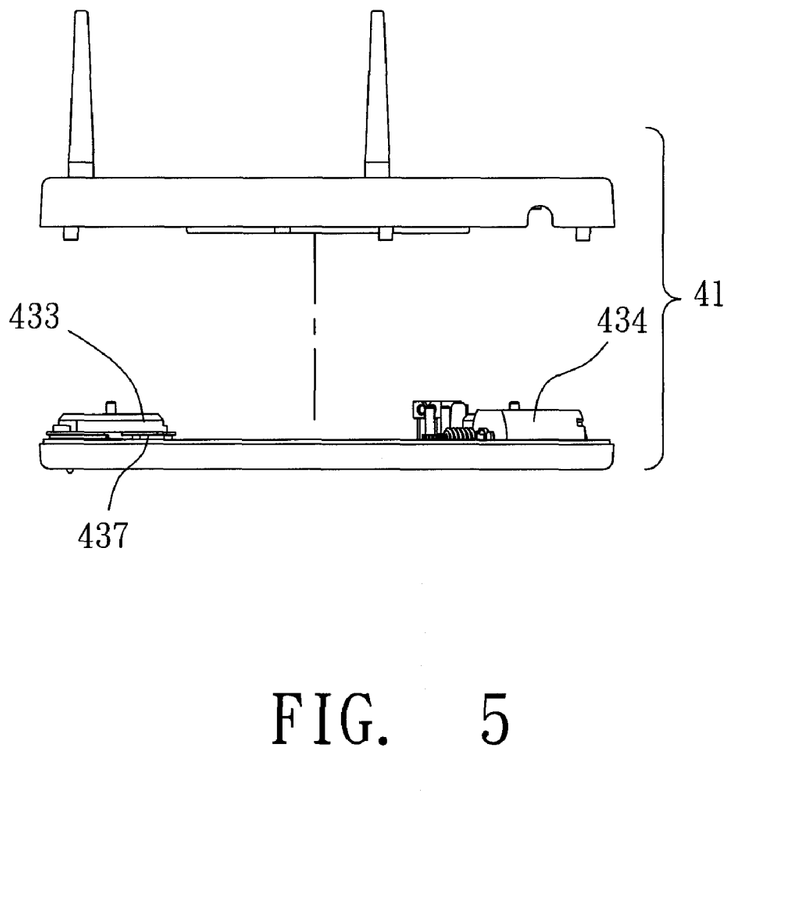
FIG. 5 is an exploded elevation view of the body and the disk feeding mechanism in FIG. 4.
Figure 7:
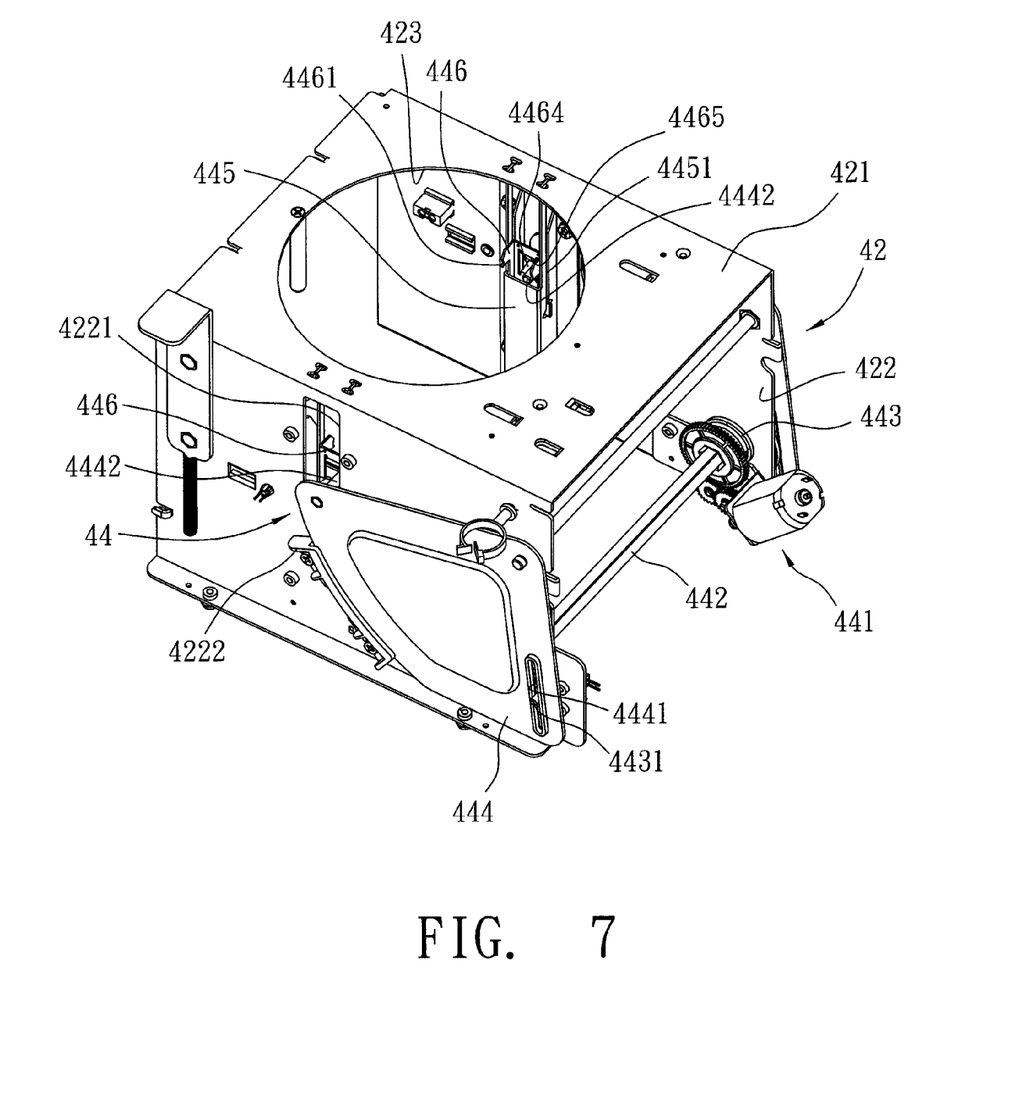
FIG. 7 is a perspective view of a supporting base of a disk feeding device of the duplicating apparatus in FIG. 1.

Refer to FIG. 2, FIG. 5 and FIG. 7. The disk feeding device 40 comprises a body 41, a supporting base 42, a disk feeding mechanism 43, a disk conveying device 44, a housing assembly 45, a disk guiding device 46 and a disk collecting device 47.

The supporting base 42 is mounted on the frame 20 at a position aligned with the ejected positions of the first and the second trays 310, 322. The supporting base 42 comprises a top 421 and two side wings 422. The top 421 has an opening 423 defined completely through the top 421. The opening 423 has a diameter larger than the diameter of the disk so as to allow the disk to pass through the opening 423. In addition, the opening 423 is aligned with the holding positions 311, 323 of the trays 310, 322 as the trays 310, 322 are ejected at their ejected positions.

The body 41 is mounted on the top 421 and comprises two casings 411 combined mutually each other. The body 41 has a disk feeding hole 412 aligned with the opening 423. In this embodiment, the disk feeding hole 412 and the opening 423 are concentric.

Figure 4:
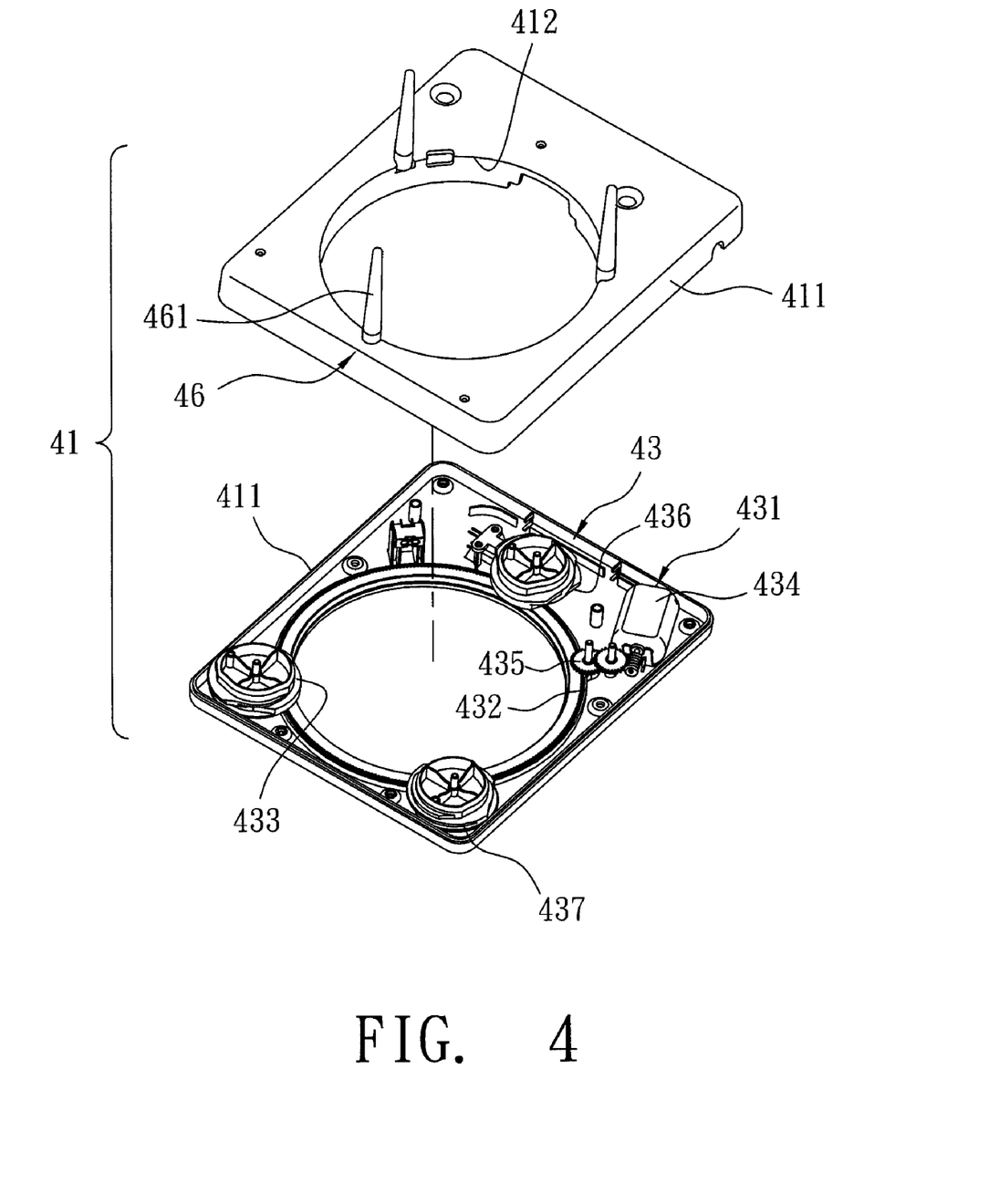
FIG. 4 is an exploded perspective view of a body and a disk feeding mechanism of a disk feeding device of the duplicating apparatus in FIG. 1.

The disk feeding mechanism 43 is mounted in the body 41 and comprises a driving assembly 431, a transmission member 432 and multiple disk feeding wheels 433. The driving assembly 431 comprises a motor 434 and reducing gears 435. The transmission member 432 is an annular gear and engages the reducing gears 435. The disk feeding wheels 433 are rotating members and engage the transmission member 432 so that the transmission member 432 can simultaneously rotate the disk feeding wheels 433. The disk feeding wheels 433 have respectively a periphery and a cut edge 436 and a feeding thread 437 formed on the periphery. Further, the disk feeding wheels 433 are partially extended in the disk feeding hole 412. In the embodiment there are three disk feeding wheels 433.

Consequently, the portions of the disk feeding wheels 433 in the disk feeding hole 412 supports and suspends a stack of blank disk over the disk feeding hole 412. When using the disk feeding device 43 to gradually and sequentially feed the disk onto the holding portions 311, 323 (only one single disk is fed once), the motor 434 rotates the transmission member 432 through the reducing gears 435. The rotating transmission member 432 rotates simultaneously the disk feeding wheels 433. Rotations of the disk feeding wheels 433 move the bottom disk of the disk stack through the cut edges 436, along the feeding threads 437 and are eventually pulled through the opening 423 by gravity. When the bottom disk departs from the disk feeding wheels 433, the motor 434 is stopped. Thus, the disk feeding mechanism 43 controls feeding single disk onto the tray at a time.

The disk guiding device 46 is mounted on the body 41 around the disk feeding hole 412 to align the blank disks in position. In the embodiment, the disk guiding device 46 comprises three guiding posts 461. The disk collecting device 47 is removably mounted in the supporting base 42 to receive completed or copied disks. In the embodiment, the disk collecting device 47 is a container.

Figure 8:
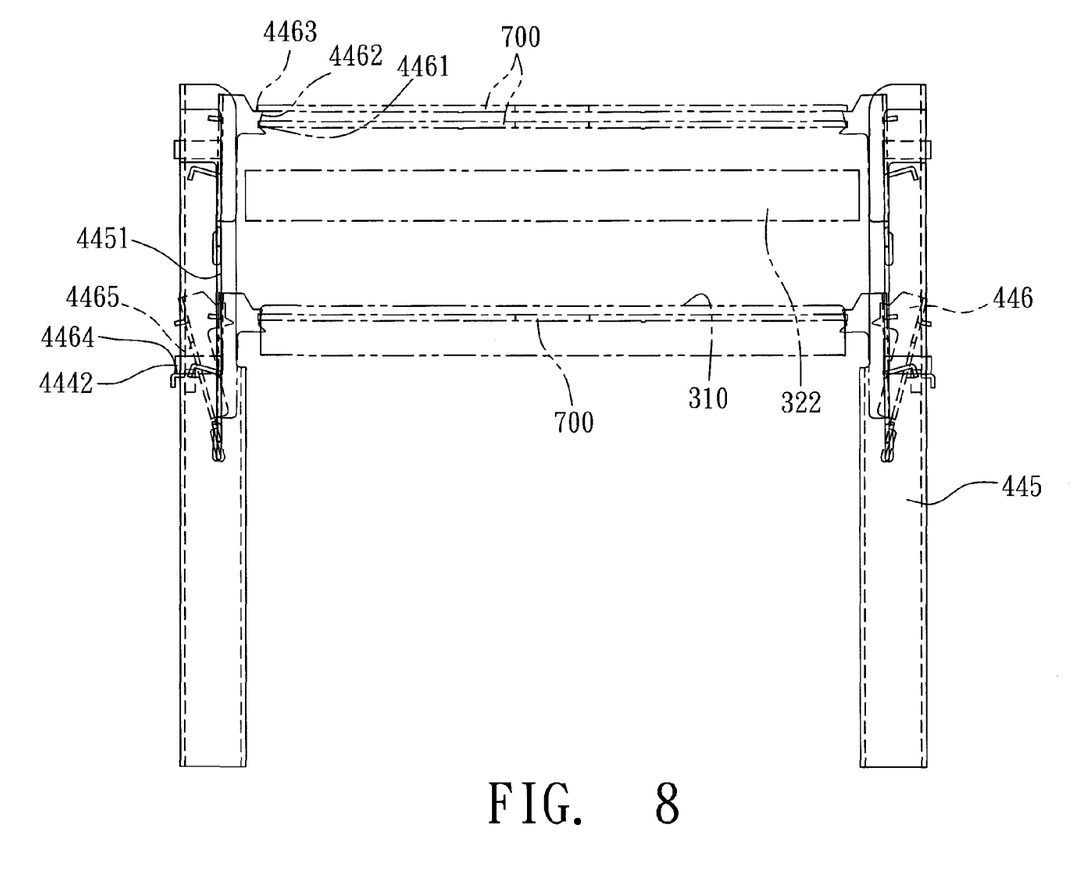
FIG. 8 is an operational elevation view of two conveying members of a disk conveying device of a disk feeding device of the duplicating apparatus in FIG. 1.

Further refer to FIG. 8, the disk conveying device 44 comprises a driving device 441, a rotating shaft 442, two eccentric wheels 443, two driving wings 444, two sliding guides 445 and two conveying members 446. The driving device 441 is coupled to the rotating shaft 442 and rotates the rotating shaft 442. The rotating shaft 442 is rotatably mounted on the side wings 422 and comprises two ends.

The eccentric wheels 443 are respectively mounted at the ends of the rotating shaft 442 and are rotated by the rotating shaft 442. Each eccentric wheel 443 comprises an eccentric member 4431. The eccentric members 4431 extend respectively out of the side wings 422. Each side wing 422 comprises an elongated hole 4221 and a guiding seat 4222.

The driving wings 444 are respectively mounted on the side wings 422. Each driving wing 444 has a guiding slot 4441 and an impelling rod 4442. The eccentric members 4431 are slidably mounted in the guiding slots 4441 and slide along the guiding slots 4441. The impelling rods 4442 are movably mounted in the elongated holes 4221 to move the conveying members 446. Each driving wing 444 has a sector shape and an edge sliding on the guiding seat 4222.

The sliding guides 445 are respectively mounted on the side wings 422 inside and are aligned respectively with the elongated holes 4221. Each sliding guide 455 has a guiding device. In the embodiment, the guiding device is an elongated guiding slot 4451.

The conveying members 446 are respectively and slidably mounted in the elongated guiding slot 4451 to grasp a disk 700 to convey the disk 700 to duplicate, read and print. Each conveying member 446 comprises a grasping portion 4461, an inclined guide 4462, a landing portion 4463, a pressing portion 4464 and a pushing portion 4465. In the embodiment, each grasping portion 4461 is a recess. Each inclined guide 4462 is an inclined surface. Each landing portion 4463 is a flat surface.

The impelling rod 4442 extends into the elongated hole 4221 and is positioned between the pressing portion 4464 and the pushing portion 4465. The impelling rod 4442 moves the conveying member 446 along the elongated guiding slot 4451 in a linear movement. In the embodiment, the linear movement is an upward and downward movement. Each conveying member 446 is connected to a resilient member, such as a spring.

In the embodiment, when the disk 700 falls onto the holding portion 311 of the first tray 310 (the first tray 310 is located at its ejected position at the moment), the first tray 31 retracts into the duplicating and printing device 31 to write in or read out data. When the operation is completed, the first tray 310 is ejected to its ejected position.

The driving device 441 of the disk conveying device 44 rotates the eccentric wheels 443 through the rotating shaft 442. The rotations of the rotated eccentric wheels 443 move respectively the eccentric members 4431 along the guiding slots 4441 in reciprocal motions to drive reciprocally the driving wings 444 sliding along the guiding seats 4222.

The reciprocal motions of the driving wings 444 move the impelling rods 4442 along elongated holes 4421 in linear movements, which moves the conveying members 446 sliding along the elongated guiding slot 4451 by the impelling rods 4442 pressing the pressing portions 4464 and pushing the pushing portions 4465.

When the conveying members 446 do not grasp the disk 700, the impelling rods 4442 press down the pressing portions 4464 to make the conveying members 446 inclined. The first tray 310 is ejected after the duplicating operation has been completed. The impelling rods 4442 are moved towards the pushing portions 4465 by the driving wings 444. The inclined conveying members 446 stand vertically by the resilient elements to grasp the disk 700 through the grasping portions 4461, which is a first stage of conveying operation.

The impelling rods 4442 are continuously moved to abut and push the pushing portions 4465 so that the disk 700 grasped by the conveying members 446 is moved upwards until the disk is above the second tray 322. In this circumstance, the first tray 310 can be retracted to its retracted position, and the second tray 322 is ejected to its ejected position. The conveying members 446 moves downwards when the conveying members 446 reach their highest points to place the disk 700 onto the holding portion 323 of the second tray 322. The disk 700 disengages from the conveying members 446 by means of the inclined guides 4462 and is eventually positioned on the second tray 322, which is a second stage of conveying operation.

The second tray 322 with the disk 700 is retracted to its retracted position so that the printing head 321 prints the disk identifiers on the cover of the disk 700. The second tray 322 with the disk 700 is ejected to its ejected position after printing the cover is completed. The conveying members 446 move the disk 700 upwards by the landing portions 4463, and the second tray 322 is retracted to its retracted position again, which is the third stage of conveying operation. The conveying members 446 are moved downwards by the impelling rods 4442 continuously pressing the pressing portions 4464 until the conveying members 446 are inclined again as their original states. The disk 700 is pulled by gravity and falls into the disk collecting device 47 to complete one operation procedure of feeding, copying and printing for the disk.

The housing assembly 45 is mounted on the frame 20 to house the interior components of the frame 20 and comprise an upper cover 451. The upper cover 451 covers the disk feeding hole 412.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An auto feed, copy and print apparatus for information storage disks, and the apparatus comprising a frame;

a duplicating and printing device mounted on the frame and comprising at least one tray, each of the at least one tray having an ejected position and a retracted position, and comprising a holding portion; and a disk feeding device mounted on the frame and comprising a body having a disk feeding hole, wherein the disk feeding hole is aligned with the holding portion when the at least one tray is positioned at its ejected position; and a disk feeding mechanism mounted in the body and comprising multiple disk feeding wheels, the disk feeding wheels partially extended in the disk feeding hole to support a stake of disks over the disk feeding hole and feed a single one of the stake of disks falling onto the holding portion at the ejected position of the at least one tray by gravity when the disk feeding wheels are rotated;

wherein the at least one tray moves to its retracted position to copy and print the compact disk on the holding portion when the disk is fed on the holding portion.

2. The apparatus as claimed in claim 1, wherein the duplicating and printing device comprises a duplicating apparatus and a printing apparatus, the duplicating apparatus is a compact disk burner and comprises a first tray, and the printing apparatus comprises a second tray.

3. The apparatus as claimed in claim 2, wherein the frame has a rear opposite to the disk feeding device, and the duplicating and printing device is mounted into the frame through the rear of the frame.

4. The apparatus as claimed in claim 2, wherein the printing apparatus comprises a cover and a printing head, the cover is pivotally mounted on the frame and has a given angle relative to the frame, and the printing head is mounted inside the cover.

5. The apparatus as claimed in claim 3, wherein the disk feeding device further comprises
 a supporting base mounted on the frame at a position aligned with the ejected position of the at least one tray, and comprising a top and two side wings, the top supporting the body and having an opening defined completely through the top wherein the disk feeding hole and the opening are concentric; and
 a disk conveying device mounted on the side wings to convey a disk.

6. The apparatus as claimed in claim 5, wherein each of the side wings comprises an elongated hole, and the disk conveying device comprises
 a driving device;
 a rotating shaft rotatably mounted on the side wings of the supporting base, rotated by the driving device and comprising two ends;
 two eccentric wheels respectively mounted at the ends of the rotating shaft and rotated by the rotating shaft, each eccentric wheel comprising an eccentric member extended out of the associated side wing;
 two driving wings respectively mounted on the side wings, each driving wing having a guiding slot and an impelling rod, wherein the eccentric members are slidably mounted in the guiding slots and slide along respectively the guiding slots, and the impelling rods are movably mounted in the elongated holes;
 two sliding guides respectively mounted on the side wings inside and aligned respectively with the elongated holes, each sliding guide having a guiding device; and
 two conveying members respectively and slidably mounted in the guiding devices and moved respectively by the impelling rods to grasp a disk to convey.

7. The apparatus as claimed in claim 6, wherein each of the conveying members comprises
 a grasping portion to grasp the disk on the first tray at a first stage of operation;
 an inclined guide to remove the disk from the grasping portion and position the disk on the second tray at a second stage of operation; and
 a landing portion to push upwardly the disk on the second tray at third stage of operation.

8. The apparatus as claimed in claim 6, wherein each of the conveying members comprises a pressing portion and a pushing portion, and the impelling rod is mounted between the pressing portion and the pushing portion.

9. The apparatus as claimed in claim 5, wherein the disk conveying device comprises a disk guiding device mounted on the body around the disk feeding hole.

10. The apparatus as claimed in claim 9, wherein the disk guiding device comprises three guiding posts.

11. The apparatus as claimed in claim 5, wherein the disk feeding device further comprises a disk collecting device removably mounted in the supporting base.

12. The apparatus as claimed in claim 5, wherein the disk feeding device further comprises a housing assembly mounted on the frame and comprising an upper cover covering the disk feeding hole.

13. The apparatus as claimed in claim 1, wherein the disk feeding mechanism further comprises
 a driving assembly comprising a motor and reducing gears; and
 a transmission member engaging the reducing gears;
 wherein the disk feeding wheels engage the transmission member, and each of the disk feeding wheels has a periphery, a cut edge and a feeding thread formed on the periphery.

14. The apparatus as claimed in claim 13, wherein the disk feeding wheels are three.

15. The apparatus as claimed in claim 13, wherein the transmission member is annular.

16. The apparatus as claimed in claim 6, wherein each side wing further comprises a guiding seat, and each driving wing is a sector and has an edge sliding alone the associated guiding seat.

17. A method to auto feed, copy and print for information storage disks and the method comprising
 (a) providing disks, the disks being information storage disks;
 (b) suspending the disks in a stack by a disk feeding device and using gravity to sequentially pull the stacked disks down through the disk feeding device;
 (c) receiving sequentially a single one of the falling disks by a first tray;
 (d) retracting the first tray with the single one of the falling disks into a duplicating and printing device; and
 (e) writing data into the disk on the first tray and printing a cover of the disk on the first tray by the duplicating and printing device.

18. The method as claimed in claim 17, wherein the step (e) further comprises
 writing data into the disk on the first tray;
 ejecting the first tray;
 grasping and raising the disk on the first tray;
 placing the grasped disk onto a second tray;
 retracting the second tray into a printing apparatus;
 printing the cover of the disk on the second tray by the printing apparatus;
 ejecting the second tray;
 pushing upwardly the disk on the second tray; and
 retracting the second tray into the printing apparatus.

19. The method as claimed in claim 17, wherein the information storage disks are optical rewritable disks.

20. The method as claimed in claim 17, wherein the information storage disks are optical recordable disks.

* * * * *